United States Patent [19]

Coran et al.

[11] 3,855,262
[45] Dec. 17, 1974

[54] N-(HYDROCARBYLTHIO) AMIDES

[75] Inventors: Aubert Yaucher Coran; Joseph Edward Kerwood, both of Akron, Ohio

[73] Assignee: Monsanto Company, St. Louis, Mo.

[22] Filed: Sept. 6, 1973

[21] Appl. No.: 394,558

Related U.S. Application Data

[60] Continuation-in-part of Ser. No. 208,447, Dec. 15, 1971, abandoned, which is a continuation-in-part of Ser. No. 29,717, March 27, 1970, Pat. No. 3,752,824, which is a division of Ser. No. 714,445, March 20, 1968, Pat. No. 3,546,185.

[52] U.S. Cl.............................................. 260/453 R
[51] Int. Cl.................... C07c 119/18, C07c 119/20
[58] Field of Search................... 260/453 R; 71/118; 424/298

[56] References Cited
UNITED STATES PATENTS

| | | | |
|---|---|---|---|
| 2,417,004 | 3/1947 | Martin et al. | 260/397.7 |
| 2,476,655 | 7/1949 | Fox et al. | 260/239.6 |
| 3,187,042 | 6/1965 | Richter | 260/453 R |
| 3,344,153 | 9/1967 | Kuhle et al. | 260/453 R |
| 3,439,018 | 4/1969 | Brookes et al. | 260/453 R |
| 3,546,185 | 12/1970 | Coran et al. | 260/309.2 |
| 3,646,097 | 2/1972 | Stevick | 260/453 R |

*Primary Examiner*—Glennon H. Hollrah

[57] ABSTRACT

Compounds of the formula

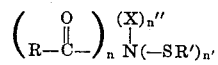

where $n$, $n'$ and $n''$ are integers, the sum of which is three, $n$ and $n'$ being one or two, and $n''$ being zero or one, and R is alkyl, aryl or cycloalkyl, R' is aryl or cycloalkyl and X is hydrogen or R which are excellent premature vulcanization inhibitors.

16 Claims, No Drawings

N-(HYDROCARBYLTHIO) AMIDES

CROSS REFERENCES TO RELATED APPLICATIONS

This application is a continuation-in-part of application Ser. No. 208,447 filed Dec. 15, 1971 now abandoned which application Ser. No. 208,447 is a continuation-in-part of application Ser. No. 29,717 filed Mar. 27, 1970 now U.S. Pat. No. 3,752,824 granted Aug. 14, 1973 which application Ser. No. 29,717 is a division of application Ser. No. 714,445 filed Mar. 20, 1967 now U.S. Pat. No. 3,546,185 granted Dec. 8, 1970.

FIELD OF THE INVENTION

This invention relates to compounds useful as inhibitors of premature vulcanization in rubber which are characterized by the formula

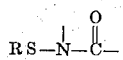

wherein the dangling valence on the carbonyl is satisfied by alkyl, aryl, or cycloalkyl and the dangling valence on the nitrogen is satisfied by alkyl, aryl, cycloalkyl, hydrogen, or —SR.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

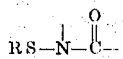

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual generic sense to mean univalent aliphatic radicals of the series $C_nH_{2n+1}$ and includes radicals substituted in the carbon chain, as for example, by aryl, alkoxy, nitro, chloro, bromo, fluoro, iodo, and hydroxy. Primary, secondary, and tertiary alkyls are included, for example, straight or branched chains. However, primary and secondary alkyl hydrocarbons of 1 to 20 carbon atoms are the preferred alkyl compounds of this invention. The term cycloalkyl includes cycloalkyl radicals of 5 to 12 carbon atoms in the ring. The term lower alkyl means alkyl of 1–5 carbon atoms. Aryl of 6–12 carbon atoms is suitable with phenyl being the preferred aryl radical.

The imide moiety may, of course, be formed from two independent radicals as in $(A)_2N—SR$ where A is acyl derived from a carboxylic acid and R is alkyl, cycloalkyl, or aryl. A is, for example,

where R is alkyl, cycloalkyl, or aryl. Similarly, —SR may be the substituent of a simple amide as in A—N-H—SR or two —SR substituents may be present as in AN—(SR)$_2$.

Compounds formed from one or two independent acyl radicals may be represented by the formula

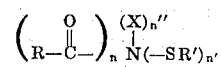

where n, n' and n'' are integers, the sum of which is three, n and n' being one or two, and n'' being zero or one, R and R' independently are alkyl, aryl, or cycloalkyl and X is hydrogen or R. Compounds of this formula in which n and n' are one are preferred and a preferred subgroup represented by said formula in which R is lower alkyl or phenyl, X is hydrogen and R' is cycloalkyl. Compounds in which the radical attached to sulfur is hydrocarbyl are especially potent inhibitors.

Illustrative examples of new compounds of this invention are N-(phenylthio)acetamide, N-(benzylthio)acetamide, N-(cyclopentylthio)acetamide, N-(cyclohexylthio)acetamide, N-(cyclooctylthio)acetamide, N,N-di(phenylthio)acetamide, N,N-di(benzylthio)-acetamide, N,N-di(cyclopentylthio)acetamide, N,N-di(cyclohexylthio)acetamide, N,N-di(cyclooctylthio)acetamide, N-(phenylthio)-diacetamide, N-(benzylthio)diacetamide, N-(cyclopentylthio(-diacetamide, N-(cyclohexylthio)-diacetamide, N-(cyclooctylthio)-diacetamide, N-(phenylthio)-N-methyl-acetamide, N-(benzylthio)-N-methyl-acetamide, N-(cyclopentylthio)-N-methyl-acetamide, N-(cyclohexylthio)-N-methyl-acetamide, N-(cyclooctylthio)-N-methyl-acetamide, N-(phenylthio)acetanilide, N-(benzylthio)-acetanilide, N-(cyclopentylthio)acetanilide, N-(cyclohexylthio)-acetanilide, N-(cyclooctylthio)acetanilide, N-(phenylthio)-benzamide, N-(benzylthio)benzamide, N-(cyclopentylthio)benzamide, N-(cyclohexylthio)-benzamide, N-(cyclooctylthio)benzamide, N,N-di(phenylthio)benzamide, N,N-di(benzylthio)-benzamide, N,N-di(cyclopentylthio)benzamide, N,N-di(cyclohexylthio)benzamide, N,N-di(cyclooctylthio)-benzamide, N-(phenylthio)dibenzamide, N-(benzylthio)dibenzamide, N-(cyclopentylthio)dibenzamide, N-(cyclohexylthio)dibenzamide, N-(cyclooctylthio)-dibenzamide, N-(phenylthio)-N-methyl-benzamide, N-(benzylthio)-N-methylbenzamide, N-(cyclopentylthio)-N-methyl-benzamide, N-(cyclohexylthio)-N-methyl-benzamide, N-(cyclooctylthio)-N-methylbenzamide, N-(phenylthio)-benzanilide, N-(benzylthio)benzanilide, N-(cyclopentylthio)benzanilide, N-(cyclohexylthio)benzanilide, and N-(cyclooctylthio)benzanilide.

Further examples of compounds of the invention are N-(phenylthio)propionamide, N-(benzylthio)propionamide, N-(cyclohexylthio)propionamide, N-(phenylthio)butyramide, N-(benzylthio)butyramide, N-(cyclohexylthio)butyramide, N-(phenylthio)valeramide, N-(benzylthio)valeramide, N-(cyclohexylthio)valeramide, N-(phenylthio)hexanamide, N-(benzylthio)-hexanamide, and N-(cyclohexylthio)hexanamide.

DESCRIPTION OF THE PREFERRED EMBODIMENTS

The new compounds of this invention are prepared by reactions of the appropriate carbonyl compound and sulfenyl chloride in the presence of an acid acceptor as described in the parent application now U.S. Pat. No. 3,546,185, the examples and procedures of which are incorporated herein by reference. The reaction is conventional for introducing a thio-substituent into the nitrogen of an amide. Reaction of an amide with a sulfenyl chloride is described by Martin and Neracher U.S. Pat. No. 2,417,004, Mar. 4, 1947, Fox and Diedrich U.S. Pat. No. 2,476,655, July 19, 1949 and Goerdeler and Doerk, Chem. Ber. 95, 389 (1962).

Examples of amides suitable as intermediates in the preparation of compounds of the invention are acetamide, N-methylacetamide, diacetamide, acetanilide, benzamide, benzanilide, propionamide, dipropionamide, butyramide, isobutyramide, dibutyramide, N-methyl-butyramide, N-acetyl-butyramide, diisobutyramide, valeramide, isovaleramide, N-methylvaleramide, divaleramide, hexanamide and dihexanamide.

Benzenesulfenyl chloride (0.20 mole) in 40 ml of dimethylformamide is added dropwise at room temperature to acetamide (0.20 mole) and pyridine (0.20 mole) in 100 ml of dimethylformamide. An exothermic reaction is observed which causes the temperature of the reaction mixture to rise to 38°C. After stirring 1 hour, the mixture is poured into a liter of water. The red oil which separates is extracted with chloroform. The chloroform extract is washed with water, dried over sodium sulfate, and vacuum stripped to yield a liquid residue. Upon addition of 100 ml of heptane to the residue, crystallization occurs. N-(phenylthio)acetamide, m.p. 98°–102°C, is recovered by filtration. N-(phenylthio)acetamide recrystallized from heptane melts at 104.2°–105.0°C. analyses give 57.38% carbon, 5.53% hydrogen, 8.34% nitrogen and 18.91% sulfur compared to 57.46% carbon, 5.42% hydrogen, 8.38% nitrogen, and 19.17% sulfur calculated for $C_8H_9NOS$.

To prepare N,N-di(phenylthio)acetamide, benzene sulfenyl chloride (0.2 mole) in carbon tetrachloride is added slowly over a 25 minute period at 5°–10°C to a mixture comprising acetamide (0.2 mole) and triethylamine (0.2 mole) in 200 ml of trichloroethylene. The mixture is allowed to warm to room temperature and by-product triethylamine salt is removed by filtration. The filtrate is evaporated to yield an oil which upon addition of heptane precipitates a yellow solid. Recrystallized twice from heptane N,N-di(phenylthio)acetamide melts at 71.5°–73.0°C. Infrared analysis shows no NH bands present. Analyses give 22.15% sulfur compared to 23.3% sulfur calculated for $C_{14}H_{13}NOS_2$.

N-(phenylthio)benzamide is prepared by the procedure described in U.S. Pat. No. 2,417,004. A solution of benzene sulfenyl chloride (0.1 mole) in carbon tetrachloride is added dropwise over a period of 30 minutes to benzamide (0.1 mole) and pyridine (1.54 mole) during which time the temperature rises from 30° to 40°C. The reaction mixture is stirred for 15 minutes and poured into 750 ml of hydrochloric acid solution containing 1.54 moles of acid. A reddish precipitate is recovered by filtration and recrystallized twice from benzene and once from toluene. Infrared analysis confirms the identity of the product. N-(phenylthio)benzamide melts at 123°C. Analyses show 6.26% nitrogen and 13.94% sulfur compared to 6.13% nitrogen and 14.0% sulfur calculated for $C_{13}H_9NOS$.

N-(cyclohexylthio)acetamide is prepared by reacting cyclohexylsulfenyl chloride and acetamide in the presence of pyridine to give the desired product, m.p. 63°–64°C. Another suitable method comprises reacting cyclohexylsulfenyl chloride with a salt of acetamide as follows: Acetamide (0.3 mole) and sodium methoxide (0.3 mole) in methanol is warmed until the acetamide dissolves. The mixture is then vacuum stripped to yield sodium acetamide which is then slurried in 50 ml of heptane. To the stirred slurry there is added cyclohexanesulfenyl chloride (0.3 mole) in 300 ml of heptane. After part of the sulfenyl chloride is added, 100 ml of dimethylformamide is added to dissolve the sodium acetamide, and the remainder of sulfenyl chloride is added. After the mixture is stirred 30 minutes, 600 ml of water is added, the heptane layer is separated, and the water portion extracted with chloroform. The heptane and chloroform solutions are combined, washed with water, dried over sodium sulfate and vacuum stripped to yield a residue. The residue is taken up in 100 ml of heptane and cooled to −70°C to induce crystallization. The crystals are recovered by filtration. Recrystallized from heptane, N-(cyclohexylthio)acetamide melts at 66.3°–66.8°C. Analyses give 55.36% carbon, 8.49% hydrogen, 8.06% nitrogen, and 18.30% sulfur compared to 55.45% carbon, 8.73% hydrogen, 8.08% nitrogen and 18.50% sulfur calculated for $C_8H_{15}NOS$.

N-(cyclohexylthio)benzamide is also prepared in the presence of an acid acceptor but preferably the sulfenyl chloride is reacted with a salt of benzamide as follows: Butyllithium (0.05 mole) in about 40 ml of hexane is added over a period of 20 minutes to a solution of benzamide (0.05 mole) in about 400 ml of anhydrous benzene. Upon the addition a thick, white precipitate forms. After stirring five minutes, cyclohexanesulfenyl chloride (0.05 mole) in heptane is added over a 10-minute period at room temperature. The mixture is stirred an additonal 30 minutes and filtered. The filtrate is vacuum stripped to recover crude product. The residue is dissolved in 200 ml of ether and filtered to remove a small amount of insoluble salt. The filtrate is dried over sodium sulfate and stripped to yield an oily residue. The oil is slurried in 100 ml of heptane and crystallized by the addition of 30 ml of ether. The product is collected by filtration and recrystallized from an ethanolwater mixture. The N-(cyclohexylthio)benzamide melts at 107°–108°C. Analyses give 65.63% carbon, 7.18% hydrogen, 5.86% nitrogen and 13.77% sulfur compared to 66.35% carbon, 7.28% hydrogen, 5.95% nitrogen, and 13.62% sulfur calculated for $C_{13}H_{17}NOS$.

Benzene sulfenyl chloride (0.5 mole) is added dropwise over a period of 45 minutes at 23°–55°C to a solution comprising n-butyramide (0.5 mole) and triethylamine (0.5 mole) in 200 ml of dimethylformamide. After stirring the mixture for 15 minutes, the amine salt by-product is removed by filtration. The filtrate is quenched in a liter of water. The product is extracted in 200 ml of benzene, dried over sodium sulfate and filtered. The benzene is removed with a rotary evaporator to give 75.5 grams of N-(phenylthio)-n-butyramide, m.p. 52°–53°C recrystallized from xylene. Chemical analyses give 7.17% nitrogen and 15.83% sulfur compared to 7.17% nitrogen and 16.42% sulfur calculated for $C_{10}H_{13}NOS$. Identification is confirmed by NMR analysis.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization, and antidegradants, none being the inhibitor used. For the purposes of this invention, sulfur-vulcanizing agent means elemental sulfur or sulfur-containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexylsulfenamide, 2-mercaptobenzothiazole, N-tert-butyl 2-benzothiazolesulfenamide, and 2-(morpholinothio) benzothiazole can be used. Amine salts of mercaptobenzothiazole accelerators, for example, the t-butylamine salt of mercaptobenzothiazole, like salts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamylsulfenamides, thioureas, xanthates, and guanidine derivatives, are substantially improved using the process of our invention.

The inhibitors of our invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene with other monomers, for example, styrene acrylonitrile, isobutylene, and methyl methacrylate. The invention relates to diene rubbers, and the terms rubber and diene rubber are synonymous for the purpose of this invention.

The following tables illustrate the invention in greater detail and the best mode for carrying it out, but are not to be construed as to narrow the scope of our invention. For all the rubber stocks tested and described, infra, as illustrative of the invention, Mooney scorch times at 121°C and 135°C are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144°C, and in some cases 153°C. Curing characteristics are determined by means of the Monsanto Oscillating Disk Rheometer described by Decker, Wise and Guerry in Rubber World, December, 1962, page 68. From the Rheometer data, R.M.T. is the maximum torque in Rheometer units, $t_3$ or $t_2$ is the time in minutes for a rise of three or two Rheometer units, respectively, above the minimum reading and $t_{90}$ is the time required to obtain a torque 90% of the maximum.

The trademarks of some compounds used in the practice of this invention are Santocure MOR, Santoflex 77, and Santocure NS. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide.

The compounds are tested in a masterbatch composed of:

| | Parts |
|---|---|
| Smoked sheets | 100 |
| Intermediate super abrasion furnace black | 45 |
| Zinc oxide | 3 |
| Stearic acid | 2 |
| Aromatic oil plasticizer | 5 |

Table I illustrates the compounds as premature vulcanization inhibitors in stocks of natural rubber containing a phenylenediamine antidegradant and the accelerator Santocure NS. A control stock not shown containing no inhibitor is run for purposes of comparison.

TABLE I

| Stock | 1 | 2 | 3 | 4 | 5 | 6 |
|---|---|---|---|---|---|---|
| Masterbatch | 155 | 155 | 155 | 155 | 155 | 155 |
| Sulfur | 2 | 2 | 2 | 2 | 2 | 2 |
| Santocure NS | 0.5 | 0.5 | 0.5 | 0.5 | 0.5 | 0.5 |
| N-1,3-dimethylbutyl-N'-phenyl-p-phenylenediamine | 2 | 2 | 2 | 2 | 2 | 2 |
| N-(phenylthio)benzamide | 0.5 | — | — | — | — | — |
| N-(phenylthio)acetamide | — | 0.5 | — | — | — | — |
| N,N-di(phenylthio)acetamide | — | — | 0.5 | — | — | — |
| N-(cyclohexylthio)acetamide | — | — | — | 0.5 | — | — |
| N-(cyclohexylthio)benzamide | — | — | — | — | 0.5 | — |
| N-(phenylthio)-n-butyramide | — | — | — | — | — | 0.5 |
| Mooney Scorch at 121°C | | | | | | |
| $t_5$, min. | 61.3 | 71.6 | 81.0 | 106.6 | 88.5 | 60.0 |
| % Increase in Scorch Delay | 82 | 112 | 137 | 212 | 159 | 96 |
| Rheometer at 144°C | | | | | | |
| R. M. T. | 50.0 | 51.0 | 49.5 | 49.5 | 50.0 | 61.6 |
| $t_2$ | 12.5 | 13.3 | 18.3 | 20.7 | 17.8 | 14.2 |
| $t_{90}$ | 23.6 | 24.5 | 32.0 | 34.7 | 32.4 | 26.8 |

Table II illustrates the use of N-(phenylthio)benzamide as premature vulcanization inhibitor in a stock containing the accelerator Santocure MOR.

TABLE II

| Stock | 1 | 2 |
|---|---|---|
| Masterbatch | 155 | 155 |
| Sulfur | 2.5 | 2.5 |
| Santocure MOR | 0.5 | 0.5 |
| N-1,3-dimethylbutyl-N'-phenyl-p-phenylenediamine | 2.0 | 2.0 |
| N-(phenylthio)benzamide | — | 1.0 |
| Mooney Scorch at 121°C | | |
| $t_5$, min. | 35.2 | 85.3 |
| Percent increase in scorch delay | — | 144 |
| Rheometer at 144°C | | |
| R. M. T. | 61.0 | 63.8 |
| $t_2$ | 8.7 | 20.0 |
| $t_{90}$ | 27.7 | 39.2 |

Table III shows the curing characteristics determined by means of the Rheometer with a stock containing AN—(SR)$_2$ and the antioxidant Santoflex 77.

TABLE III

| Stock | 1 | 2 |
|---|---|---|
| Natural Rubber | 100 | 100 |
| High abrasion furnace black | 50 | 50 |
| Zinc Oxide | 5 | 5 |
| Stearic Acid | 3 | 3 |
| Hydrocarbon softener | 10 | 10 |
| Sulfur | 2.5 | 2.5 |
| Santoflex 77 | 3 | 3 |
| Santocure MOR | 0.5 | 0.5 |
| N,N-di(phenylthio)acetamide | — | 1.0 |
| Rheometer at 144°C | | |
| $t_2$ | 7.2 | 15.5 |
| $t_{90}$ | 18.0 | 27.2 |
| R. M. T. | 54.9 | 56.5 |
| $k_2$ | .183 | .187 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

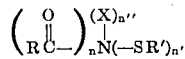

where $n$, $n'$ and $n''$ are integers, the sum of which is three, $n$ and $n'$ being one or two, and $n''$ being zero or one, R is lower alkyl or phenyl, R' is hydrocarbyl which is phenyl, benzyl or cycloalkyl of 5–8 carbon atoms and X is hydrogen or R.

2. A compound of the formula

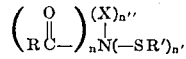

where $n$, $n'$ and $n''$ are integers, the sum of which is three, $n$ and $n'$ being one or two, and $n''$ being zero or one, R is methyl or phenyl, R' is hydrocarbyl which is phenyl, benzyl or cycloalkyl of 5–8 carbon atoms and X is hydrogen or R.

3. A compound of claim 2 wherein $n$, $n'$ and $n''$ are one.

4. A compound of claim 1 wherein $n$ is one, $n'$ is two and $n''$ is zero.

5. A compound of claim 4 wherein R is methyl.

6. A compound of claim 5 wherein R' is phenyl.

7. A compound of the formula

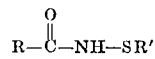

where R is lower alkyl or phenyl and R' is hydrocarbyl which is cycloalkyl of 5–8 carbon atoms, phenyl or benzyl.

8. A compound of claim 7 wherein R is n-propyl.

9. A compound of claim 8 wherein R' is phenyl.

10. A compound of the formula

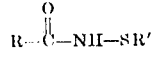

where R is methyl or phenyl and R' is hydrocarbyl which is cycloalkyl of 5–8 carbon atoms, phenyl or benzyl.

11. A compound of claim 10 wherein R is methyl.

12. A compound of claim 11 wherein R' is phenyl.

13. A compound of claim 11 wherein R' is cyclohexyl.

14. A compound of claim 10 wherein R is phenyl.

15. A compound of claim 14 wherein R' is phenyl.

16. A compound of claim 14 wherein R' is cyclohexyl.

* * * * *